United States Patent
Zhang et al.

(10) Patent No.: US 8,760,807 B1
(45) Date of Patent: Jun. 24, 2014

(54) METHOD FOR PROVIDING A WRAPAROUND SHIELD FOR A MAGNETIC RECORDING TRANSDUCER USING A DAMASCENE PROCESS

(71) Applicant: Western Digital (Fremont), LLC, Fremont, CA (US)

(72) Inventors: Jinqiu Zhang, Fremont, CA (US); Ying Hong, Los Gatos, CA (US); Feng Liu, San Ramon, CA (US); Zhigang Bai, Milpitas, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 78 days.

(21) Appl. No.: 13/631,696

(22) Filed: Sep. 28, 2012

(51) Int. Cl.
*G11B 5/127* (2006.01)
*B44C 1/22* (2006.01)

(52) U.S. Cl.
USPC ... 360/125.3; 360/121; 360/122; 360/125.02; 360/125.12; 360/317; 216/22; 216/44; 216/62; 216/67; 216/74; 216/89; 216/96; 29/603.07; 29/603.13; 29/603.14; 29/603.15; 29/603.18

(58) Field of Classification Search
CPC .. G11B 5/1278; G11B 5/3116; G11B 5/3143; G11B 5/315; G11B 5/3163; G11B 5/11; G11B 5/112; B82Y 10/00; B82Y 25/00; C25D 5/10

USPC ........................ 216/22, 44, 62, 67, 74, 89, 96; 29/603.07, 603.13, 603.14, 603.15, 29/603.16, 603.18; 360/121, 122, 125.02, 360/125.12, 125.3, 317
See application file for complete search history.

(56) References Cited

U.S. PATENT DOCUMENTS

| | | | |
|---|---|---|---|
| 7,444,740 B1 * | 11/2008 | Chung et al. | 29/603.16 |
| 7,898,773 B2 | 3/2011 | Han et al. | |
| 8,015,692 B1 | 9/2011 | Zhang et al. | |
| 8,066,892 B2 | 11/2011 | Guthrie et al. | |
| 8,117,738 B2 | 2/2012 | Han et al. | |
| 8,136,224 B1 | 3/2012 | Sun et al. | |
| 8,136,225 B1 | 3/2012 | Zhang et al. | |
| 8,196,285 B1 * | 6/2012 | Zhang et al. | 29/603.13 |
| 8,231,796 B1 * | 7/2012 | Li et al. | 216/22 |
| 8,451,563 B1 * | 5/2013 | Zhang et al. | 360/125.3 |
| 2010/0112486 A1 * | 5/2010 | Zhang et al. | 430/314 |
| 2011/0146060 A1 | 6/2011 | Han et al. | |
| 2011/0151279 A1 | 6/2011 | Allen et al. | |

\* cited by examiner

*Primary Examiner* — Nadine Norton
*Assistant Examiner* — Christopher Remavege

(57) ABSTRACT

A method fabricates a magnetic transducer having a nonmagnetic layer and an ABS location corresponding to an ABS. Etch stop and nonmagnetic etchable layers are provided. A side shield layer is provided between the ABS location and the etch stop and etchable layers. A pole trench is formed in the side shield and etchable layers. The pole trench has a pole tip region in the side shield layer and a yoke region in the etchable layer. A nonmagnetic side gap layer, at least part of which is in the pole trench, is provided. A remaining portion of the pole trench has a location and profile for a pole and in which at least part of the pole is formed. A write gap and trailing shield are provided. At least part of the write gap is on the pole. At least part of the trailing shield is on the write gap.

10 Claims, 11 Drawing Sheets

Side View

ABS View

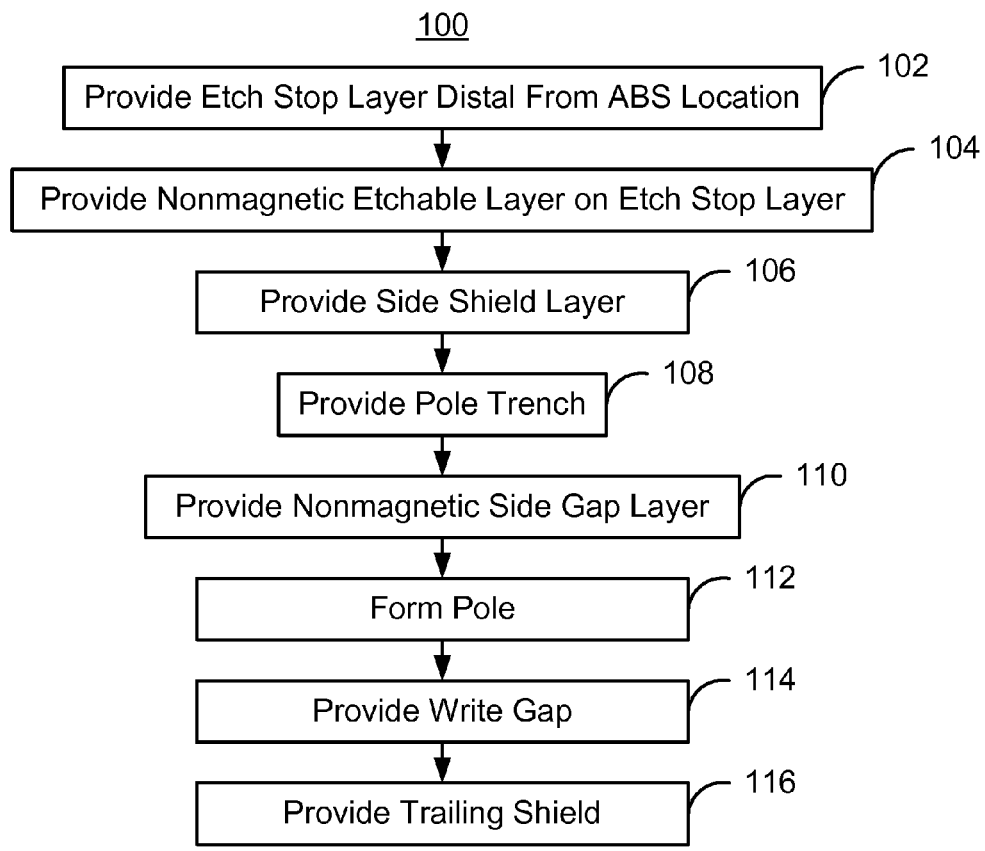
FIG. 3
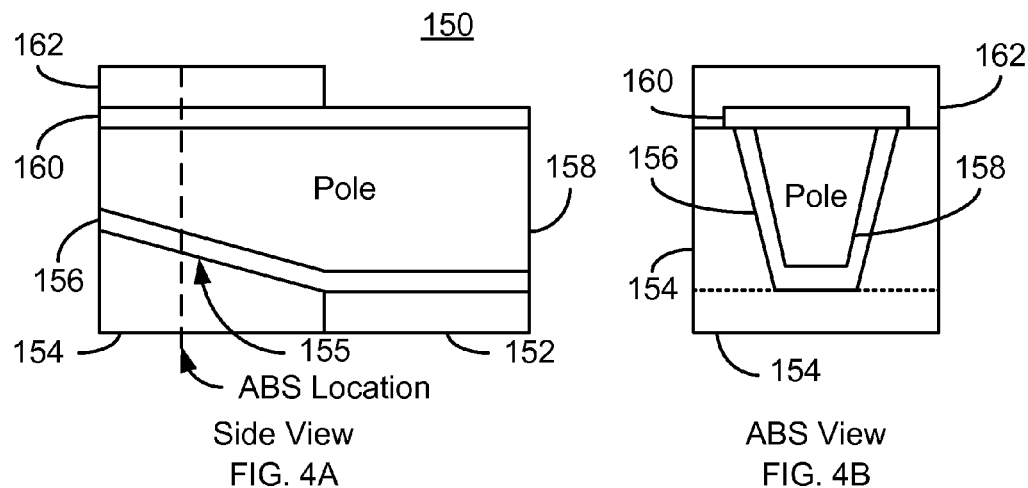
Side View
FIG. 4A
ABS View
FIG. 4B

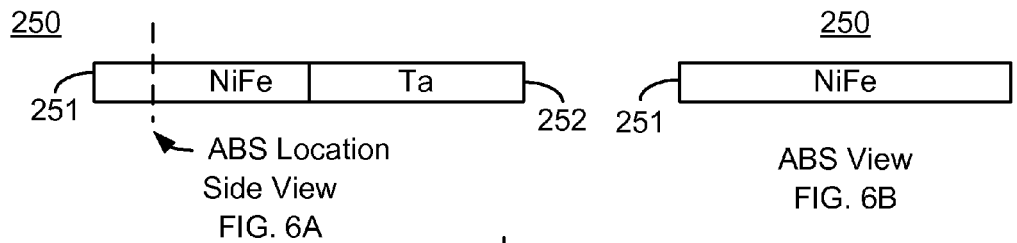
ABS Location
Side View
FIG. 6A
ABS View
FIG. 6B
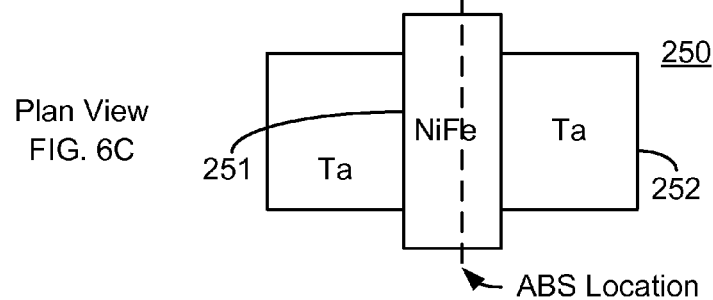
Plan View
FIG. 6C
ABS Location
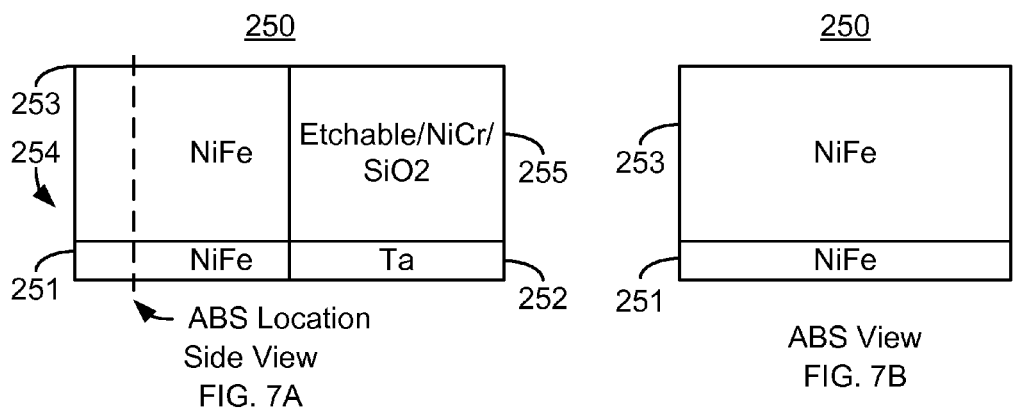
ABS Location
Side View
FIG. 7A
ABS View
FIG. 7B
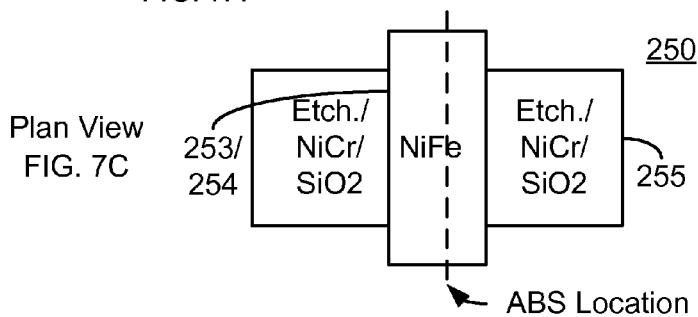
Plan View
FIG. 7C
ABS Location

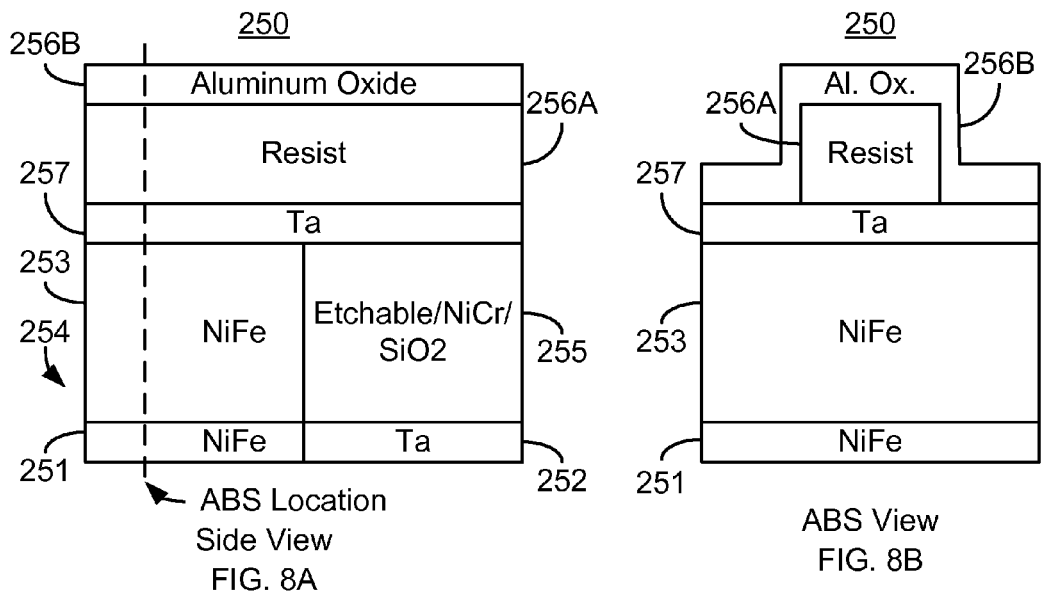
ABS Location
Side View
FIG. 8A
ABS View
FIG. 8B
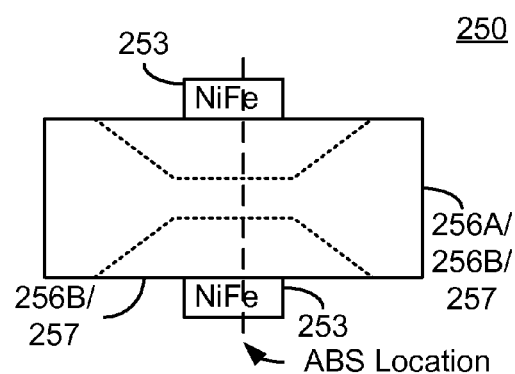
Plan View
FIG. 8C

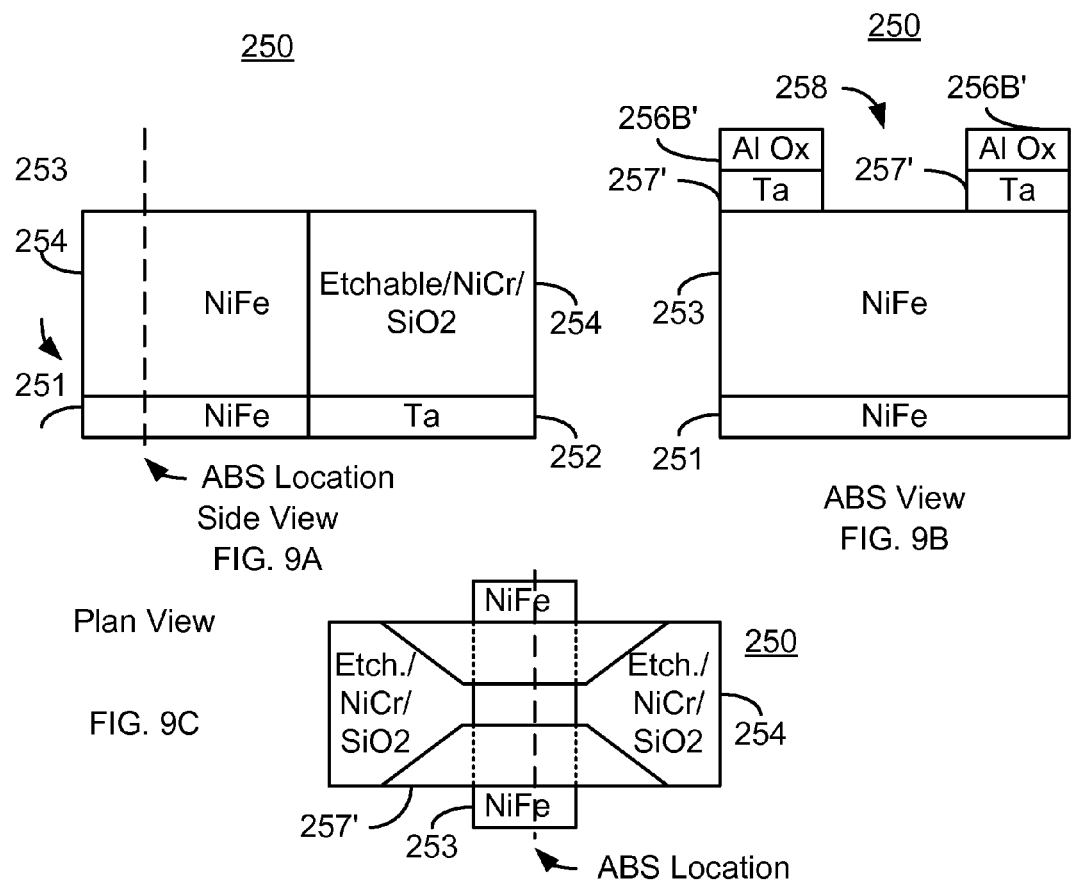

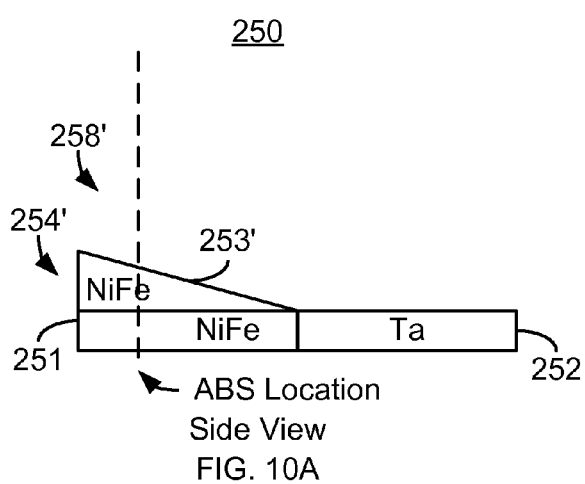
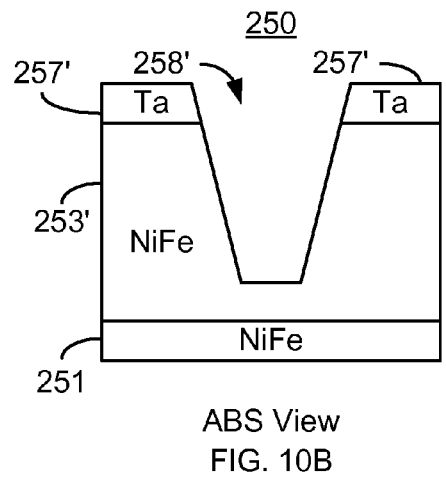
ABS Location
Side View
FIG. 10A
ABS View
FIG. 10B
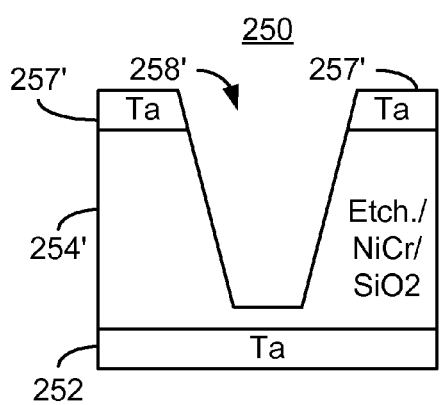
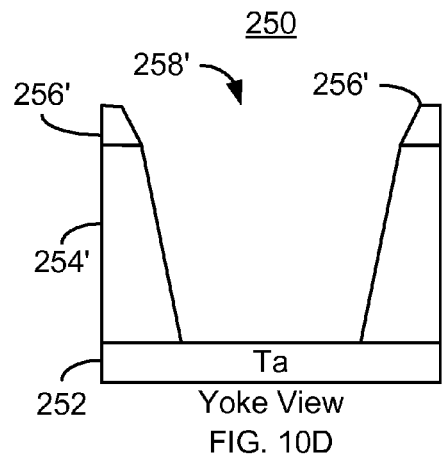
FIG. 10C
Yoke View
FIG. 10D
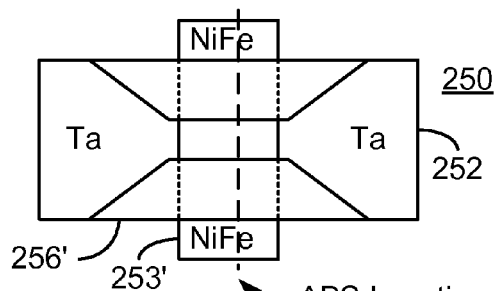
ABS Location
Plan View
FIG. 10E ABS Location
Side View ABS View Yoke View ABS Location
Plan View ABS Location
Side View ABS View Yoke View Plan View ABS Location
Side View ABS View Yoke View ABS Location
Plan View ABS Location
Side View ABS View Yoke View Plan View

US 8,760,807 B1

METHOD FOR PROVIDING A WRAPAROUND SHIELD FOR A MAGNETIC RECORDING TRANSDUCER USING A DAMASCENE PROCESS

BACKGROUND

FIG. 1 is a flow chart depicting a conventional method 10 for fabricating for a conventional magnetic recording transducer including side shields. For simplicity, some steps are omitted. Prior to the conventional method 10 starting, underlayers such as a leading edge shield may be formed. The conventional method 10 typically starts by providing a pole, such as a perpendicular magnetic recording (PMR) pole, via step 12. Step 12 includes fabricating the pole in a nonmagnetic layer, such as aluminum oxide. For example, a process that forms a trench in the aluminum oxide layer, deposits nonmagnetic side gap/seed layers, and deposits magnetic pole layers may be used. In addition, the portion of the magnetic material external to the trench may be removed, for example using a chemical mechanical planarization (CMP) process.

The exposed aluminum oxide is wet etched, via step 14. Thus, a trench is formed around a portion of the pole near the ABS location. Note that side gap layers may remain after the aluminum oxide etch in step 14. The removal of the aluminum oxide in step 14 exposes the top surface of the leading edge shield. The side shields are then deposited, via step 16. Step 16 may include depositing seed layers and plating the side shields. Processing may then be completed, via step 18. For example, a trailing edge shield and gap may be formed.

FIG. 2 depicts plan and air-bearing surface (ABS) views of a portion of a conventional transducer 50 formed using the conventional method 10. The conventional transducer 50 includes a leading edge shield 52, side shield 54, Ru side gap layer 56 which is deposited in the trench, a pole 58, top gap layer 60, and trailing shield 62. Thus, using the conventional method 10, the pole 58, side shields 54, and trailing shield 62 may be formed.

Although the conventional method 10 may provide the conventional transducer 50, there may be drawbacks. Formation of the conventional transducer 50 may involve numerous steps, some of which may be complex. As a result, fabrication of the conventional transducer may take a longer time than desired to complete. In addition, more complicated processing may be more error-prone. The performance of the conventional transducer 50 may thus be compromised.

Accordingly, what is needed is an improved method for fabricating a transducer.

SUMMARY

A method fabricates a magnetic transducer having an ABS location corresponding to an ABS. An etch stop layer and nonmagnetic etchable layer on the etch stop layer are provided. A side shield layer is provided. The side shield layer is between the ABS location and the etch stop layer and between the ABS location and the etchable layer. A pole trench is formed in the side shield layer and the etchable layer. The pole trench has a pole tip region and a yoke region wider and deeper than the pole tip region. The pole tip region resides in the side shield layer. The yoke region resides in the etchable layer. A nonmagnetic side gap layer is provided. At least a portion of the nonmagnetic side gap layer is in the pole trench. A remaining portion of the pole trench has a location and profile for a pole. The pole is formed. At least a portion of the pole resides in the remaining portion of the pole trench. A write gap is provided. At least a portion of the write gap is on the pole. A trailing shield is provided. At least a portion of the trailing shield is on the write gap.

BRIEF DESCRIPTION OF SEVERAL VIEWS OF THE DRAWINGS

FIG. 3 is a flow chart depicting an exemplary embodiment of a method for fabricating a magnetic recording transducer including side shields.

FIGS. 4A-4B are diagrams depicting an exemplary embodiment of a magnetic transducer having side shields.

FIGS. 6A-14D are diagrams various views an exemplary embodiment of a magnetic recording transducer during fabrication.

DETAILED DESCRIPTION OF THE PREFERRED EMBODIMENTS

Figure 1:
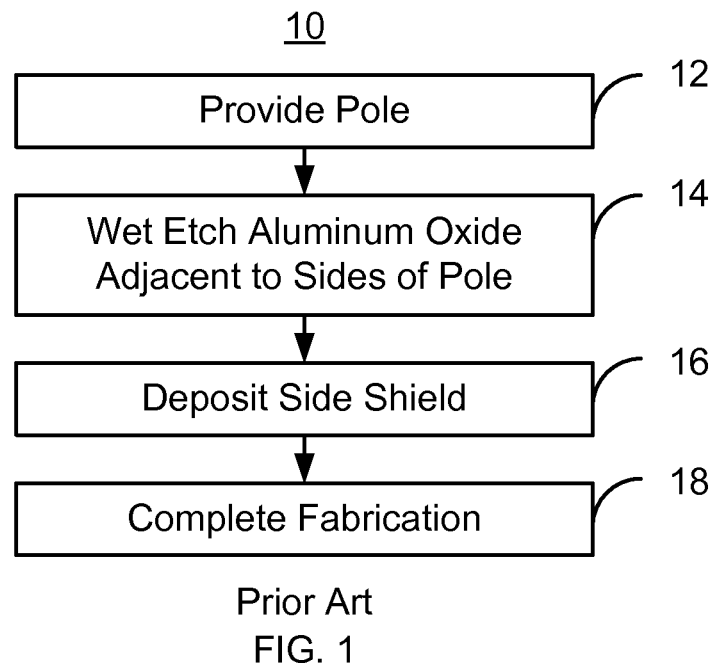
FIG. 1 is a flow chart depicting a conventional method for fabricating a magnetic recording transducer.
Figure 2:
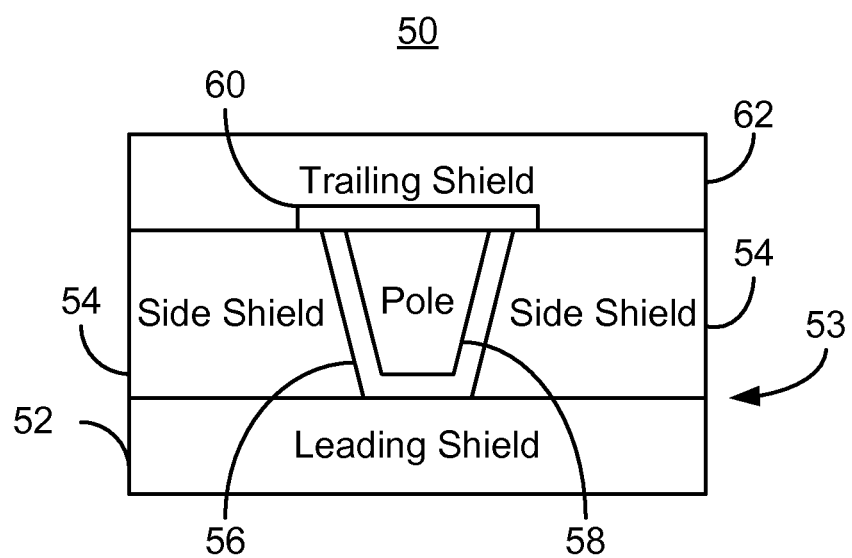
FIG. 2 is a diagram depicting an ABS view of a conventional magnetic transducer.

FIG. 3 is a flow chart depicting an exemplary embodiment of a method 100 for fabricating a transducer. The method 100 may be used in fabricating transducers such as PMR or energy assisted magnetic recording (EAMR) transducers, though other transducers might be so fabricated. For simplicity, some steps may be omitted, performed in another order, and/or combined. The magnetic recording transducer being fabricated may be part of a merged head that also includes a read head (not shown) and resides on a slider (not shown) in a disk drive. The method 100 also may commence after formation of other portions of the transducer. The method 100 is also described in the context of providing a single set of shields and their associated structures in a single magnetic recording transducer. However, the method 100 may be used to fabricate multiple transducers at substantially the same time. The method 100 and system are also described in the context of particular layers. However, in some embodiments, such layers may include multiple sub-layers.

An etch stop layer is provided distal from the ABS location, via step 102. The ABS location is the location at which the ABS is to be formed, for example by lapping the slider after formation of other portions of the transducer. The etch stop layer is a stop for a reactive ion etch (RIE) used in forming the pole trench, described below. In some embodiments, the etch stop layer is a Ta layer. The Ta layer may be at least ten and not more than twenty nanometers thick.

A nonmagnetic etchable layer is provided on the etch stop layer, via step 104. The nonmagnetic etchable layer is desired to be etchable using the RIE described above. The nonmagnetic etchable layer has a thickness at least as large as the desired thickness of the pole. In some embodiments, the nonmagnetic etchable layer is at least one of $SiO_2$ and NiCr.

A side shield layer is provided, via step 106. Step 106 may include multiple substeps and/or multiple sublayers. For example, a portion of the side shield layer residing between the ABS location and the etch stop layer may be provided first. Another sublayer that is between the ABS location and the etchable layer may be provided separately. In another embodiment, the entire side shield layer may be deposited together. The side shield layer may consist of NiFe. In some embodiments, the side shield layer includes $Ni_xFe_{1-x}$ where x is at least 0.17 and not more than 0.7.

A pole trench is provided in the side shield layer and the etchable layer, via step 108. In some embodiments, step 108 may be completed by forming a mask having an aperture having a shape and location corresponding to the pole trench, then etching the underlying layers. In some embodiments, the mask is formed by depositing a first hard mask layer, such as Ta and then providing a photoresist mask having the desired shape and location of the aperture. A second hard mask layer, such as aluminum oxide, may be deposited. The photoresist is then removed to form the aperture in the second hard mask layer. The second hard mask layer may be used to etch a corresponding aperture in the first hard mask layer. Thus, the first hard mask may be used for the etch which provides the pole trench. In other embodiments, the mask may be formed in another manner and include other materials. In some embodiments, step 108 includes performing an RIE. The RIE utilizes etch conditions that are appropriate for the side shield layer and, in at least some embodiments for the etchable layer. Thus, a NiFe etch chemistry may be used.

The pole trench formed in step 108 has a pole tip region and a yoke region wider and deeper than the pole tip region. The pole tip region is in the side shield layer, while the yoke region is in the etchable layer. Although the pole trench may be formed using a single etch, the width and depth of the trench differs between the pole tip and the yoke region. In part, this may be due to a loading effect. For example, a mask used in step 108 may have an aperture that is narrower in the pole tip region, above the side shield layer, than in the yoke region above the etchable layer. Because of the combination of the shape of the aperture, the etch conditions used, and the composition of the etchable and side shield layers, the pole trench formed may be wider and deeper in the yoke region than in the pole tip region. In addition, the variation in width and depth of the pole trench may be smooth. In some embodiments, the top of the pole trench is wider than the bottom in at least the pole tip region. The bottom of the trench in the yoke region may be formed by the etch stop layer.

A nonmagnetic side gap layer is provided, via step 110. In some embodiments, step 110 includes depositing a single nonmagnetic layer. In other embodiments, multiple sublayers may be used. In some embodiments, the side gap layer includes Ru. At least a portion of the nonmagnetic side gap layer is in the pole trench. However, the pole trench is not filled by the side gap layer. A remaining portion of the pole trench has a location and profile for a pole. In some embodiments, the top of the remaining portion of the pole trench is wider than the bottom in at least the pole tip region. However, in other embodiments, the remaining portion of the pole trench may have vertical or nearly vertical walls.

The pole is formed, via step 112. In some embodiments, step 112 includes depositing a high saturation magnetization layer. For example, the magnetic layer may be plated. In other embodiments, multiple layers, at least some of which are magnetic, may be deposited. At least part of the magnetic material deposited in step 112 resides in the remaining portion of the pole trench. A planarization may then be performed to form the pole. At least part of the pole is in the pole trench. In some embodiments, the entire pole is in the pole trench. Because the pole is formed in the pole trench in the side shield layer, the pole may be considered to be formed using a damascene process.

A write gap is provided, via step 114. At least part of the write gap is on the pole. Step 114 may include depositing at least one nonmagnetic write gap layer. In some embodiments, a portion of the nonmagnetic write gap distal from the pole may be removed.

A trailing shield may optionally be provided, via step 116. At least a portion of the trailing shield is on the write gap. In some embodiments, the trailing shield is physically and magnetically connected to the side shield. In other embodiments, the trailing shield is physically and magnetically separated from the side shields.

FIGS. 4A-4B depict a magnetic transducer 150 during after formation is continued using the method 100. In particular, side and ABS views are shown in FIGS. 4A and 4B, respectively. For clarity, FIGS. 4A-4B are not to scale. The magnetic transducer 150 includes an etch stop layer 152, a side shield layer 154, a nonmagnetic gap layer 156, a pole 158, a write gap 160 and a trailing shield 162. The etchable layer is not shown in FIGS. 4A-4B. The shield layer 154 may include multiple layers. The layers in one embodiment are indicated by the dashed line in FIG. 4B. However, in some embodiments, the layers include the same materials. In addition, although termed a side shield layer, as can be seen in FIGS. 4A and B, the layer 154 also functions as a leading shield. The nonmagnetic side gap 156 may include multiple layers. However, the sublayers of the nonmagnetic side gap layer 156 may be formed of the same material or different materials.

Using the method 100, the transducer 150 having side shields 154 may be formed. The side shields 154 may be more easily formed. In addition, note that a wraparound shield including layers 154 and 162 may be more easily provided. For example, wet etches of nonmagnetic materials surrounding the pole may be omitted. Thus, the method 100 may consume less time and resources. Further, the method 100 may be less prone to unwanted artifacts in the transducer 150. Consequently, fabrication and performance of the transducer 150 may be improved.

Figure 5:
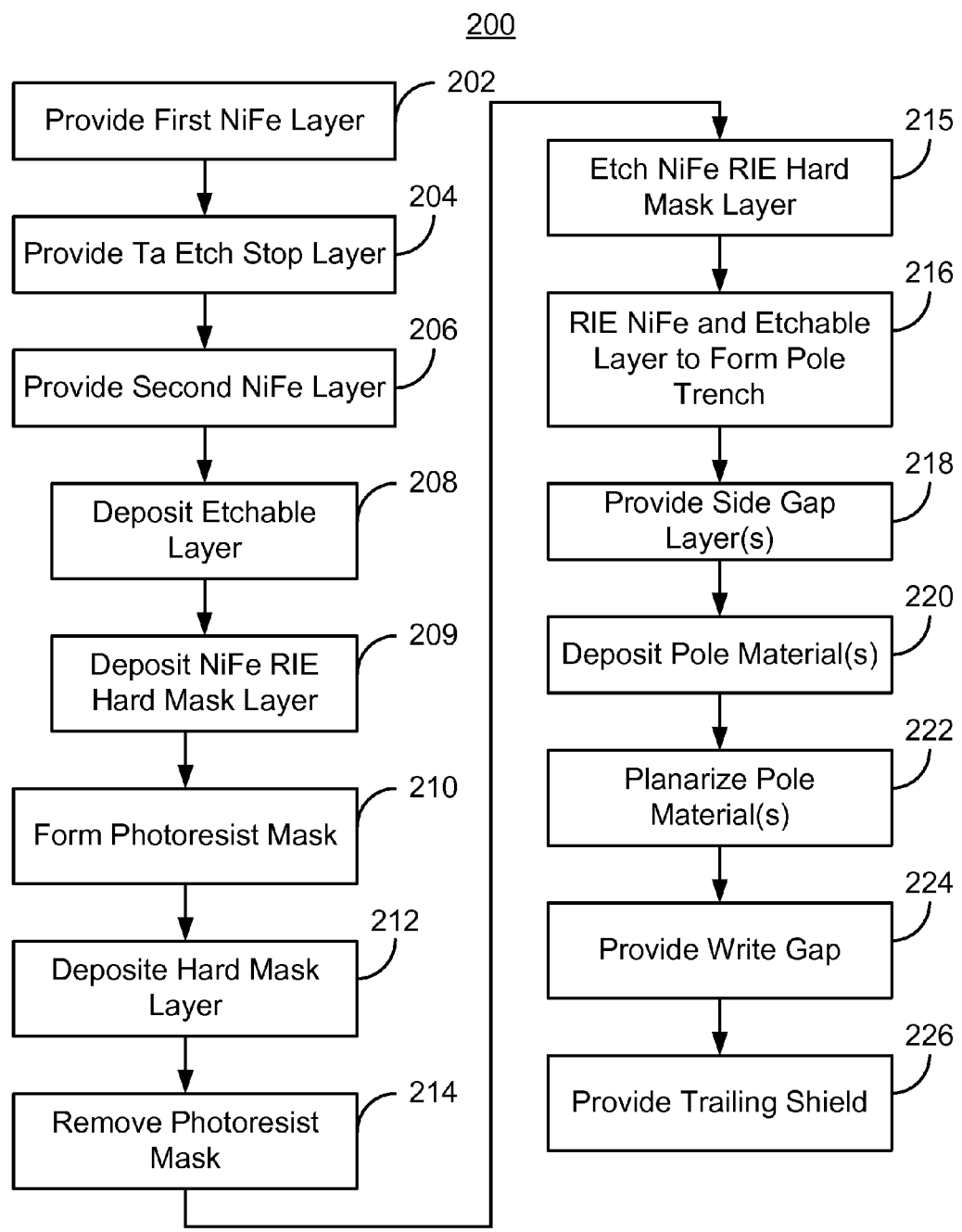
FIG. 5 is a flow chart depicting another exemplary embodiment of a method for fabricating side shields for a magnetic recording transducer.
Figure 11A:
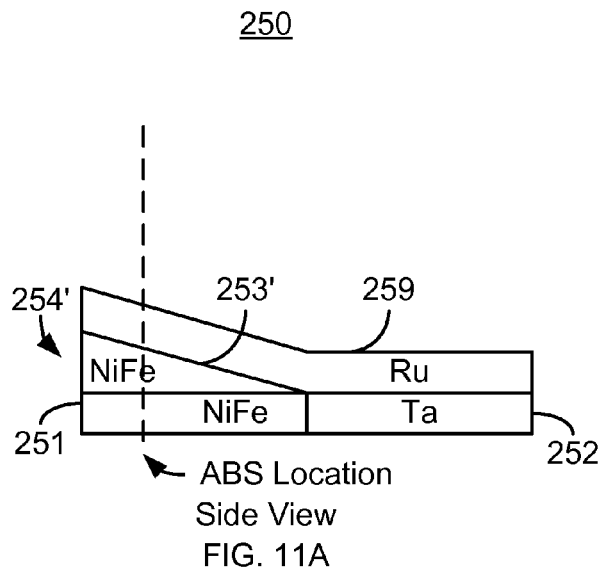
Figure 11B:
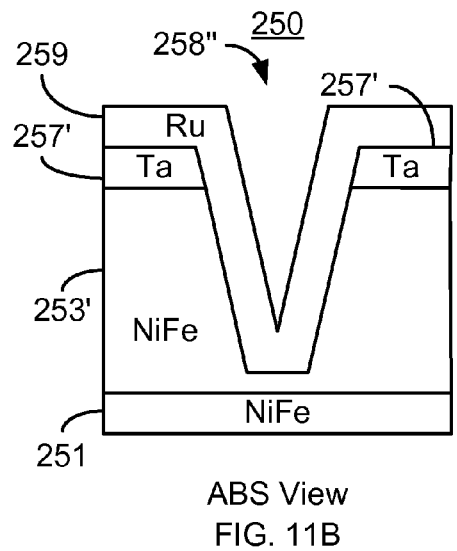
Figure 11C:
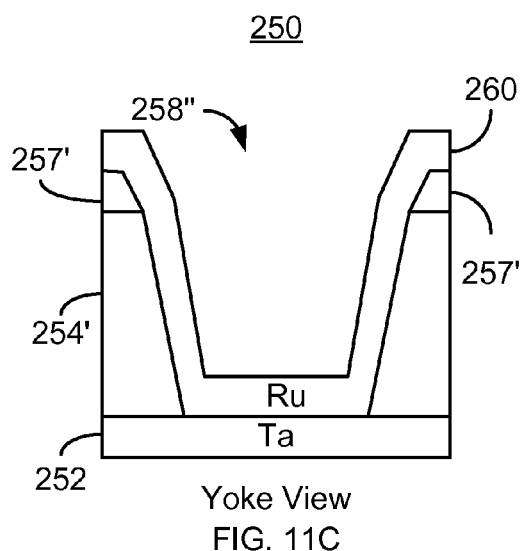
Figure 11D:
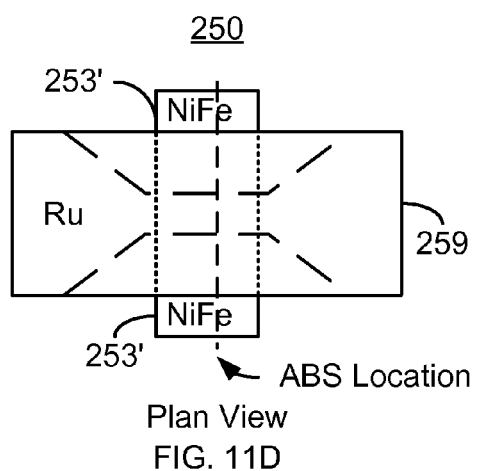
Figure 12A:
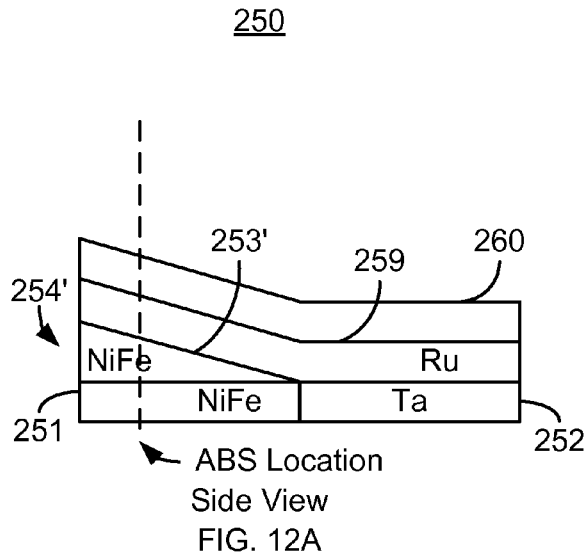
Figure 12B:
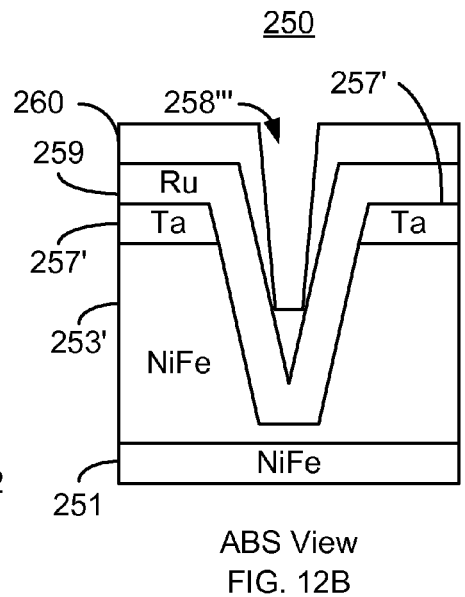
Figure 12C:
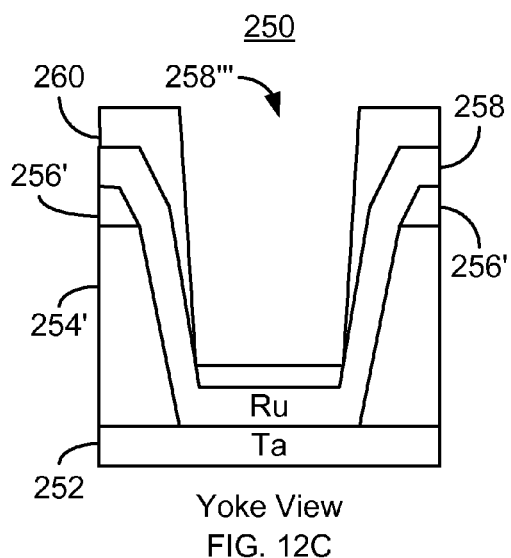
Figure 12D:
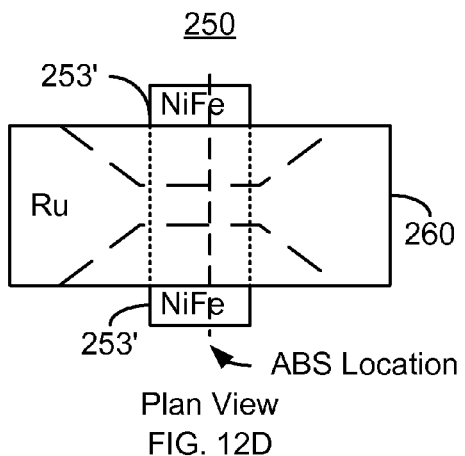
Figure 13A:
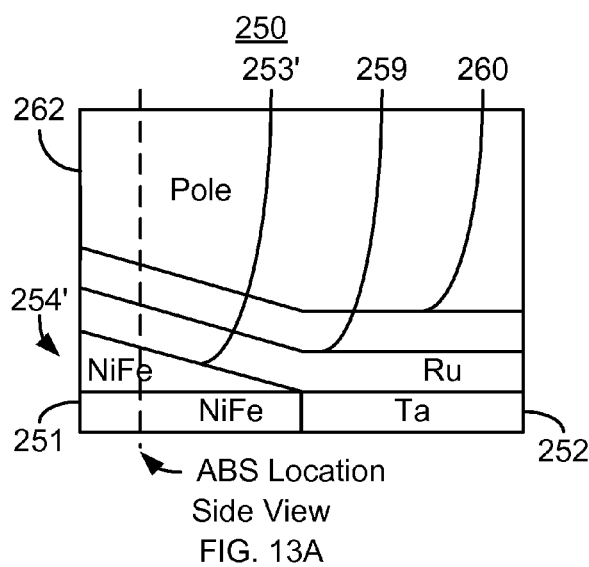
Figure 13B:
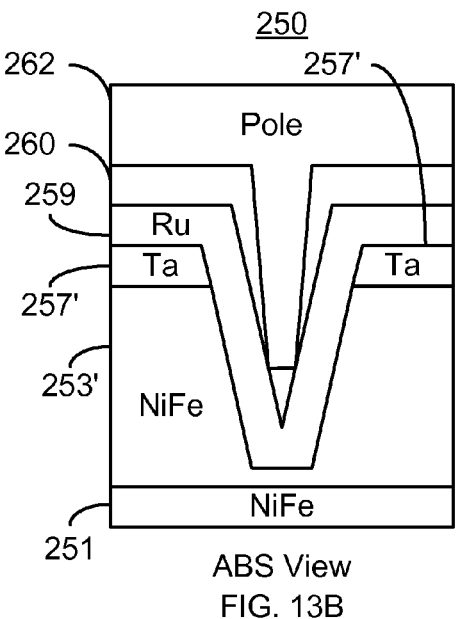
Figure 13C:
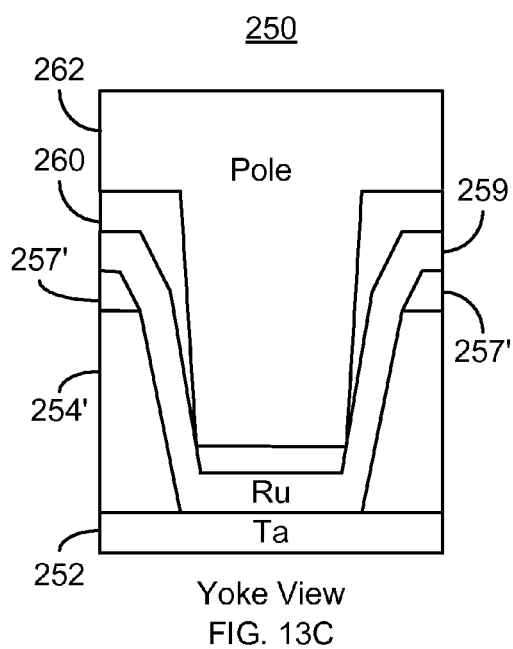
Figure 13D:
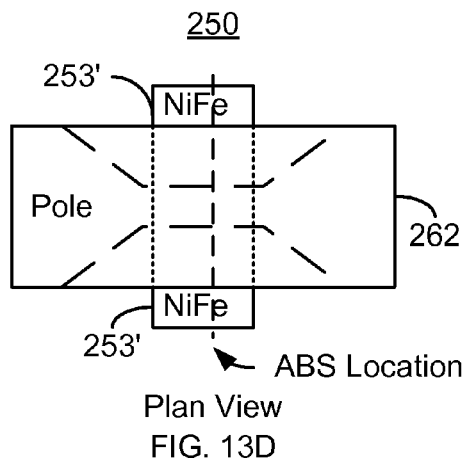
Figure 14A:
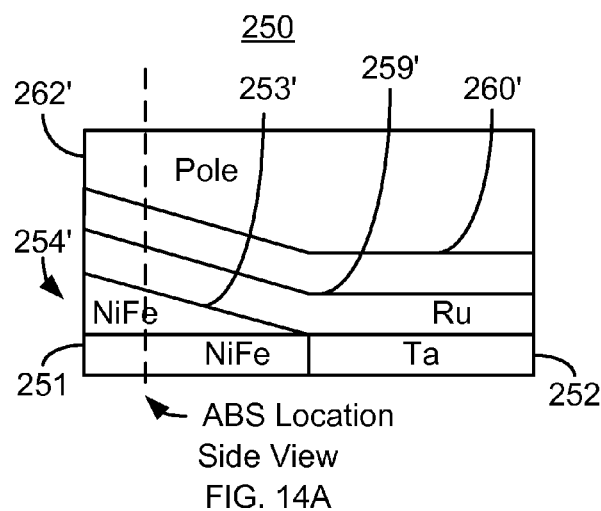
Figure 14B:
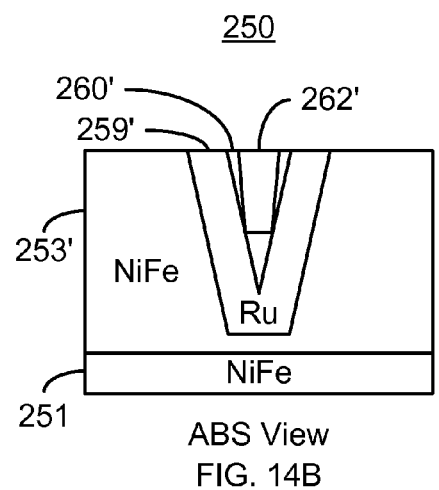
Figure 14C:
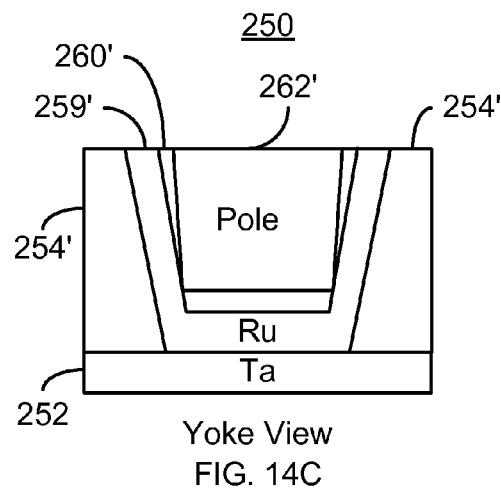
Figure 14D:
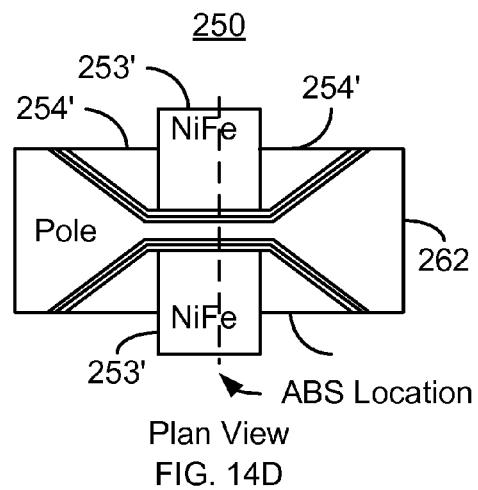

FIG. 5 is a flow chart depicting another exemplary embodiment of a method 200 for fabricating a transducer using a damascene process. For simplicity, some steps may be omitted, interleaved, and/or combined. FIGS. 6A-6C and FIGS. 14A-14D are diagrams various views of an exemplary embodiment of a portion of a transducer during 250 fabrication. For clarity, FIGS. 6A-6C and FIGS. 14A-14D are not to scale. Although FIGS. 6A-6C and FIGS. 14A-14D depict the ABS location (location at which the ABS is to be formed) and ABS at a particular point in the pole, other embodiments may have other locations for the ABS. Referring to FIGS. 5-14D, the method 200 is described in the context of the transducer 250. However, the method 200 may be used to form another device (not shown). The transducer 250 being fabricated may be part of a merged head that also includes a read head (not shown in FIGS. 6A-6C and FIGS. 14A-14D) and resides on a slider (not shown) in a disk drive. The method 200 also may commence after formation of other portions of the transducer 250. The method 200 is also described in the context of providing a single transducer 250. However, the method 200 may be used to fabricate multiple transducers at substantially the same time. The method 200 and device 250 are also described in the context of particular layers. However, in some embodiments, such layers may include multiple sublayers.

A first NiFe layer is provided, via step 202. A portion of the first NiFe layer is at the ABS location. The first NiFe layer may include $Ni_xFe_{1-x}$, where x is at least 0.17 and not more than 0.7. A Ta etch stop layer is provided, via step 204. The Ta etch stop layer is distal from the ABS location. Thus, the first NiFe layer is between the Ta etch stop layer and the ABS location. In some embodiments, the first NiFe layer and the Ta etch stop layer have the same thickness. For example, the first NiFe layer and the Ta etch stop layer may each be at least ten and not more than twenty nanometers thick. FIGS. 6A-6C depict side, ABS and plan views of the transducer 250 after step 204 is performed. Thus, NiFe layer 251 and Ta etch stop layer 252 are shown. Also depicted is the ABS location.

A second NiFe layer is provided on the first NiFe layer, via step 206. The second NiFe layer may include $Ni_xFe_{1-x}$, where x is at least 0.17 and not more than 0.7. An etchable layer is provided on the Ta etch stop layer, via step 208. The etchable layer consists of at least one of NiCr and $SiO_2$. The second NiFe layer is between the etchable layer and the ABS location. FIGS. 7A, 7B and 7C depict side, ABS and plan views of the transducer 250 after step 208 is performed. Thus, a second NiFe layer 253 and the etchable layer 255 are shown. The first NiFe layer 251 and the second NiFe layer 253 form a NiFe side shield layer 254. The NiFe side shield layer 254 is between the ABS location and the Ta layer 252 and between the ABS location and the etchable layer 255. Because the etchable layer 254 includes NiCr and/or $SiO_2$, the etchable layer 255 may be removed using the same RIE etch conditions as the NiFe side shield layer 254.

A NiFe RIE hard mask layer is deposited in step 209. A photoresist mask corresponding to a pole trench is formed, via step 210. The photoresist mask includes a pole tip region and a yoke region wider than the pole tip region. The pole tip region includes an isolated line. A aluminum oxide hard mask layer is deposited, via step 212. The aluminum oxide hard mask layer covers at least the NiFe RIE hard mask layer, the photoresist mask and the region surrounding the photoresist mask. The aluminum oxide hard mask is desired to be resistant to the etch that is to be used to form an aperture in the NiFe RIE hard mask layer. FIGS. 8A, 8B and 8C depict side, ABS and plan views of the transducer 250 after step 212 is performed. Thus, NiFe hard mask layer 257, photoresist mask 256A, and aluminum oxide hard mask layer 256B are shown.

The photoresist mask 256A and a portion of the aluminum oxide hard mask layer 256B covering the photoresist mask 256A are removed, via step 214. In some embodiments, step 214 includes ion milling the aluminum oxide hard mask layer 256B at an angle to remove a portion of the aluminum oxide hard mask layer 256B on the sides of the photoresist mask 256A. A lift-off may then be performed to remove the photoresist mask 256A. As a result, any remaining aluminum oxide hard mask layer 256B on the photoresist mask 256A is removed and an aluminum oxide hard mask is formed. The NiFe hard mask layer 257 is etched to form an aperture therein, via step 215. FIGS. 9A, 9B and 9C depict side, ABS and plan views of the transducer 250 after step 214 is performed. Thus, a NiFe RIE hard mask 257' has been formed. The NiFe RIE hard mask 257' has an aperture 258 in the location previously occupied by the photoresist mask 256A. Thus, the aperture 258 has the shape and location corresponding to the pole trench that is desired to be formed. A remaining portion of the aluminum oxide hard mask 256B' is also shown.

The NiFe side shield layer 254 and the etchable layer 255 exposed by the aperture 258 undergo an RIE using a NiFe etch chemistry, via step 216. Thus, the pole trench is provided in the region of the aperture 258. Both the NiFe side shield layer 254 and the etchable layer 255 are removed using these etch conditions. FIGS. 10A, 10B, 10C, 10D, and 10E depict side, ABS, intermediate, yoke and plan views of the transducer 250 after step 216 is performed. Thus, a pole trench 258' has been formed in the region of the aperture 258. Portions of the second NiFe layer 253/NiFe side shield layer 254 have been removed, leaving layers 253'/254', respectively. In addition, a portion of the etchable layer 254 has been removed. The etchable layer 254' remains. In addition, any remaining portion of the aluminum oxide hard mask has been removed. As can be seen by comparing the views in 10B, 10C and 10D, the pole trench 258' has a width and depth that increases away from the ABS. More specifically, in the region of the trench 258' corresponding to the isolated line is narrower and less deep. Stated differently, the pole tip region of the pole trench 258' in the side shield layer 254' is less deep and narrower. This variation may be due to the combination of the shape of the aperture 258, the etch conditions used, and the composition of the etchable layer 154 and side shield layer 254. The depth and width of the pole trench 258' increase and are deepest and widest in the yoke region. In some embodiments, as shown in FIG. 10A, this increase is smooth. However, in the yoke region, the Ta stop layer 252 forms a bottom of the pole trench 258'. Thus, although the width of the pole trench 258' may increase in the yoke region, the depth is limited by the thickness of the etchable layer 254'.

A nonmagnetic side gap layer is provided, via step 218. In some embodiments, step 218 includes depositing a single nonmagnetic layer. In other embodiments, multiple sublayers may be used. For example, FIGS. 11A, 11B, 11C and 11D depict side, ABS, yoke and plan views of the transducer 250 after a nonmagnetic gap side layer 259 has been deposited. In the embodiment shown, the side gap layer 259 is Ru that may have been deposited using chemical vapor deposition (CVD). Thus, the side gap layer 259 has substantially uniform thickness. A portion of the side gap layer 259 is within the pole trench. Thus, a remaining portion 258" of the pole trench is still open. FIGS. 12A, 12B, 12C and 12D depict side, ABS, yoke and plan views of the transducer 250 after a second side gap layer has been deposited as part of step 218. In this embodiment, the second side gap layer 260 has been deposited using ion beam deposition. In the embodiment shown, the side gap layer 260 has substantially vertical sidewalls. A remaining portion 258''' of the pole trench is still open but has substantially vertical sidewalls. The side gap layer 260 may, however, be omitted if the pole is desired to have a trapezoidal shape.

At least one magnetic pole material is plated, via step 220. In other embodiments, step 220 may be performed using sputtering or other deposition techniques. Further, multiple materials, including nonmagnetic materials, may be used in forming the pole. In addition, in some embodiments a separate seed layer (not shown) is used. FIGS. 13A, 13B, 13C and 13D depict side, ABS, yoke and plan views of the transducer 250 after step 220 is performed. In the embodiment shown in FIGS. 13A-13D, the second nonmagnetic gap layer 260 is utilized. However, in other embodiments, this layer may be omitted. Thus, pole material 262 is shown. The pole material 262 fills the remaining portion of the pole trench 258'''. Also in the embodiment shown, a portion of the pole material 262 is outside of the pole trench 258'''. Also note that the pole trench 258''' is not labeled in FIGS. 13A-13D.

The magnetic pole material 262 is planarized, via step 222. Thus, the portion of the pole material 262 outside of the pole trench 258''' is removed. FIGS. 14A, 14B, 14C and 14D depict side, ABS, yoke and plan views of the transducer 250 after step 222 is performed. Thus, the pole 262' remains. Because the pole 262' is formed in the pole trench 258''' in the side shield layer 254', the pole 262' may be considered to be formed using a damascene process.

A write gap is provided, via step 224. At least part of the write gap is on the pole 262'. Step 224 may include depositing at least one nonmagnetic write gap layer. In some embodiments, a portion of the nonmagnetic write gap distal from the pole may be removed.

A trailing shield may optionally be provided, via step 226. At least a portion of the trailing shield is on the write gap. In some embodiments, the trailing shield is physically and magnetically connected to the side shield 254'. In other embodiments, the trailing shield is physically and magnetically separated from the side shields.

Thus, using the method 200, the transducer 250 may be fabricated. The transducer 250 shares the benefits of the transducer 150. More specifically, fabrication and performance of the transducer 250 may be improved.

We claim:

1. A method for fabricating a magnetic transducer having an air-bearing surface location (ABS location) corresponding to an air-bearing surface (ABS), the method comprising:
   providing an etch stop layer;
   providing a nonmagnetic etchable layer on the etch stop layer;
   providing a side shield layer residing between the ABS location and the etch stop layer and between the ABS location and the etchable layer;
   providing a pole trench in the side shield layer and the etchable layer, the pole trench having a pole tip region and a yoke region wider and deeper than the pole tip region, the pole tip region residing in the side shield layer, the yoke region residing in the etchable layer;
   providing a nonmagnetic side gap layer, at least a portion of the nonmagnetic side gap layer residing in the pole trench, a remaining portion of the pole trench having a location and profile for a pole;
   forming the pole, at least a portion of the pole residing in the remaining portion of the pole trench;
   providing a write gap, at least a portion of the write gap being on the pole; and
   providing a trailing shield, at least a portion of the trailing shield being on the write gap.

2. The method of claim 1 wherein a portion of the pole has a bottom and a top wider than the bottom in the pole tip region.

3. The method of claim 1 wherein the side shield layer includes $Ni_xFe_{1-x}$ where x is at least 0.17 and not more than 0.7.

4. The method of claim 1 wherein the etch stop layer includes Ta.

5. The method of claim 1 wherein the etchable layer includes at least one of NiCr and $SiO_2$.

6. The method of claim 1 wherein the step of providing the pole trench further includes:
   reactive ion etching the side shield layer and the etchable layer.

7. The method of claim 6 wherein the step of reactive ion etching further includes:
   providing a NiFe etch chemistry.

8. The method of claim 1 wherein the step of providing the pole trench further includes:
   forming a first hard mask layer;
   forming a photoresist mask corresponding to the pole trench and residing on the first hard mask layer, the photoresist mask including an isolated line corresponding to at least a portion of the pole tip region;
   depositing a second hard mask layer, the second hard mask layer covering at least the photoresist mask and the first hard mask layer; and
   removing the photoresist mask and a portion of the second hard mask layer covering the photoresist mask to form a hard mask, the hard mask having an aperture therein, the aperture having a location and shape corresponding to the pole trench;
   removing a portion of the first hard mask layer to form a RIE aperture therein, the RIE aperture corresponding to the aperture and has the location and shape corresponding to the pole trench.

9. The method of claim 1 wherein the yoke region of the pole trench has a bottom at the etch stop layer.

10. A method for fabricating a magnetic transducer having an air-bearing surface location (ABS location) corresponding to an air-bearing surface (ABS), the method comprising:
   providing a first NiFe layer, a portion of the first NiFe layer residing at the ABS location;
   providing a Ta etch stop layer, the first NiFe layer residing between the Ta etch stop layer and the ABS location;
   providing a second NiFe layer on the first NiFe layer, the first NiFe layer and the second NiFe layer forming a NiFe side shield layer;
   providing a etchable layer on the Ta etch stop layer, the NiFe side shield layer residing between the ABS location and the Ta layer and between the ABS location and the etchable layer, the etchable layer being selected from a material including NiCr and $SiO_2$;
   depositing a NiFe RIE mask layer;
   forming a photoresist mask corresponding to a pole trench, the photoresist mask including first pole tip region and a first yoke region wider than the first pole tip region, the first pole tip region including an isolated line corresponding to at least a portion of the first pole tip region;
   depositing an aluminum oxide hard mask layer, the aluminum oxide hard mask layer covering at least the photoresist mask and the NiFe RIE mask layer;
   removing the photoresist mask and a portion of the aluminum oxide hard mask layer covering the photoresist mask to form an aluminum oxide hard mask, the aluminum hard mask having a first aperture therein, the first aperture having a location and shape corresponding to the pole trench;
   removing a portion of the NiFe RIE mask layer to form a second aperture therein, the second aperture corresponding to the first aperture and having the location and shape corresponding to the pole trench;
   reactive ion etching the NiFe side shield layer and the etchable layer exposed by the second aperture using a NiFe etch chemistry to provide the pole trench, the pole trench having a second pole tip region corresponding to the first pole tip region of the photoresist mask and a second yoke region corresponding to the first yoke region of the photoresist mask, the second yoke region being wider and deeper than the second pole tip region, the second pole tip region residing in the NiFe side shield layer, the second yoke region residing in the etchable layer and having a bottom corresponding to the Ta stop layer;
   providing a nonmagnetic side gap layer, at least a portion of the nonmagnetic side gap layer residing in the pole trench, a remaining portion of the pole trench having a location and profile for a pole, the nonmagnetic side gap layer including Ru;
   plating at least one magnetic pole material, part of the at least one magnetic pole material residing in the pole trench;
   planarizing the at least one magnetic pole material to provide a pole, the step of planarizing removing a portion of the at least one magnetic pole material not residing in the trench;

providing a write gap, at least a portion of the write gap being on the pole; and providing a trailing shield, at least a portion of the trailing shield being on the write gap.

* * * * *